Figure 1:
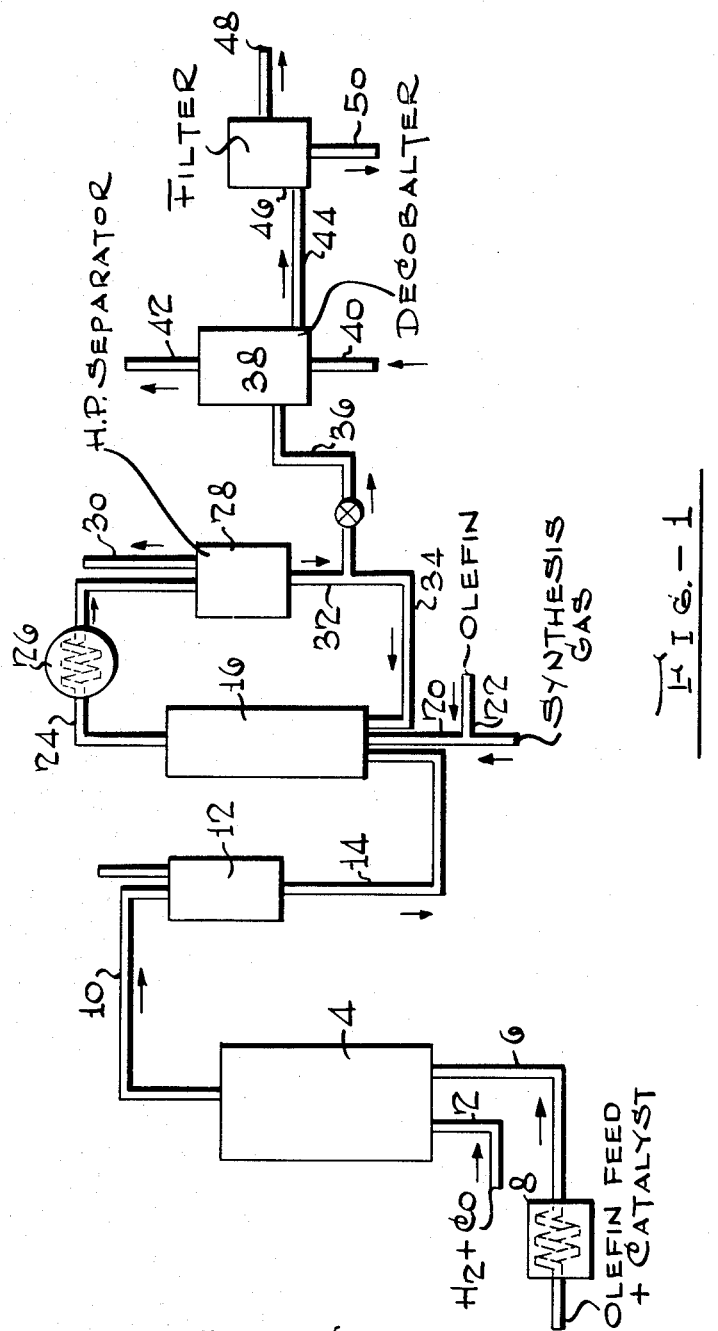
Figure 2:
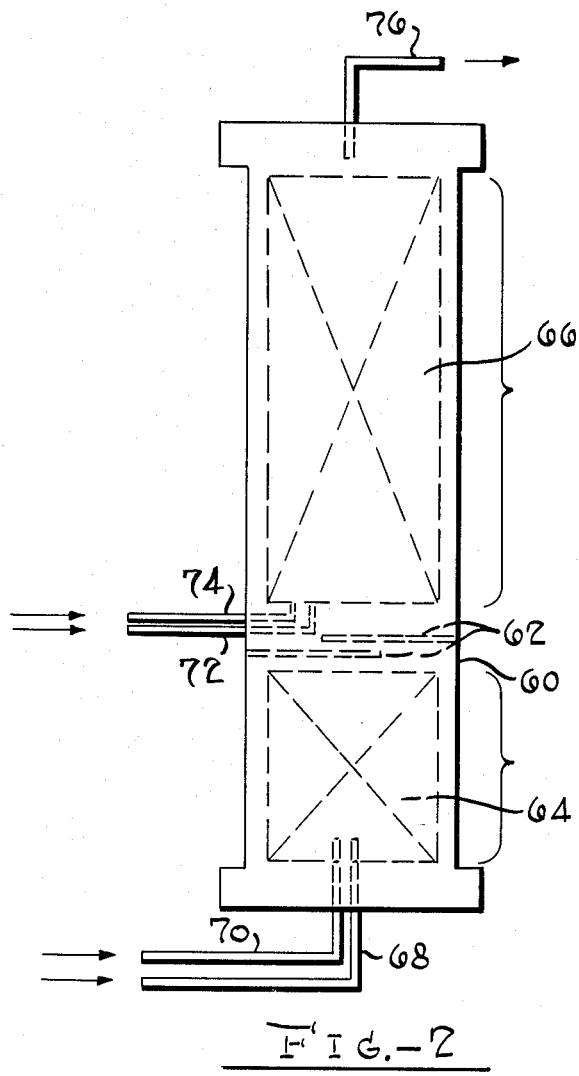

July 31, 1956　　J. K. MERTZWEILLER ET AL　　2,757,202
ALDEHYDE SYNTHESIS PROCESS
Filed March 22, 1952　　2 Sheets-Sheet 1

Joseph K. Mertzweiller
Warren M. Smith　Inventors
Kenneth E. Draeger
By Henry Berk　Attorney

United States Patent Office 2,757,202
Patented July 31, 1956

2,757,202
ALDEHYDE SYNTHESIS PROCESS

Joseph K. Mertzweiller, Warren M. Smith, and Kenneth E. Draeger, Baton Rouge, La., assignors to Esso Research and Engineering Company, a corporation of Delaware Application March 22, 1952, Serial No. 277,964

4 Claims. (Cl. 260—604)

The present invention relates to the preparation of oxygenated organic compounds by the reaction of carbon monoxide and hydrogen with carbon compounds containing olefinic linkages in the presence of a carbonylation catalyst. More specifically, this invention relates to an improved process for maintaining continuously high concentration of active catalyst in the reaction zone.

It is well known in the art that oxygenated organic compounds may be synthesized from organic compounds containing olefinic linkages by a reaction with carbon monoxide and hydrogen in the presence of a catalyst containing metals of the iron group such as cobalt or iron, preferably the former, in an essentially three-stage process. In the first stage the olefinic material, catalyst and proper proportions of CO and $H_2$ are reacted to give a product consisting predominantly of aldehydes containing one more carbon atom than the reacted olefin. This oxygenated organic mixture, which contains dissolved in it compounds such as the carbonyls and the molecular complexes of the metal catalysts, is treated in the second stage to cause removal of soluble metal compounds from the organic material in a catalyst removal zone. The catalyst-free material is then generally hydrogenated to the corresponding alcohols or it may be oxidized to the corresponding acids.

This carbonylation reaction provides a particularly attractive method for preparing valuable primary alcohols which find large markets, particularly as intermediates for plasticizers, detergents and solvents. Amenable to the reaction are long and short chain olefinic compounds, depending upon the type alcohols desired. Not only olefins, but most organic compounds possessing at least one aliphatic carbon-carbon double bond may be reacted by this method. Thus, straight and branched chain olefins and diolefins such as propylene, butylene, pentene, hexene, butadiene, pentadiene, styrene, olefin polymers such as those obtained by catalytic polymerization of propylene and butylene, etc., polypropylene, olefinic fractions from the hydrocarbon synthesis process, thermal or catalytic cracking operations, and other sources of hydrocarbon fractions containing olefins, may be used as starting material depending upon the nature of the final product desired.

The catalyst in the first stage of the process may be added in the form of salts of the catalytically active metal with high molecular weight fatty acids such as stearic, oleic, palmitic, naphthenic, etc. Thus, suitable catalysts are, for example, cobalt oleate or naphthenate. These salts are soluble in the liquid olefin feed or in the liquid products from the reaction and may be supplied to the first stage as hydrocarbon solution or dissolved in the olefin feed or in a stream of recycle products. Also, it has been proposed to employ catalyst deposited on a carrier, preferably activated with thoria, in the form of a slurry and employ the supported cobalt material in the slurry rather than the metal soap. It has also been proposed to employ other insoluble forms of cobalt such as cobalt oxide, carbonate, etc. Though this type of catalyst is considerably cheaper and more economical than the oil soluble soaps or than the supported cobalt metal on a carrier, the employment of this type of cobalt compound has, in the past, not been commercially feasible for reasons disclosed more fully below.

The synthesis gas mixture fed to the first stage may consist of any desired ratio of $H_2$ to CO, but preferably, these gases are present in about equal volumes. The conditions for reacting olefins with $H_2$ and CO vary somewhat in accordance with the nature of the olefin feed. But the reaction is generally conducted at pressures in the range of about 1500 to 4500 p. s. i. g. and at temperatures of about 300° to 400° F. The ratio of synthesis gas to olefin feed may vary widely, in general about 2500 to 15,000 cubic feet of $H_2+CO$ per barrel of olefin feed are employed.

At the end of the first stage when the desired conversion of olefins to oxygenated compounds has been effected, the product and the unreacted material are generally withdrawn to a catalyst removal zone where dissolved catalyst is removed from the mixture usually by a thermal process in the presence of a stripping gas, steam, or even chemical means.

It has been reasonably well substantiated that the active species of the catalyst is a carbonyl of the metal, probably the hydrocarbonyl. Thus, when cobalt is added as an insoluble solid or as a solution of a metallic soap, it has been found that cobalt carbonyl is always formed and when cobalt carbonyl is added to the reaction, cobalt material is obtained after the reaction is completed and the product decobalted. There are, however, vast differences in reaction rates between the various forms of cobalt. A cobalt soap is converted into cobalt carbonyl at a considerably faster rate than is a hydrocarbon-insoluble form of cobalt such as either metal or cobalt oxide. Accordingly, when an insoluble form of cobalt is employed as a catalyst, it requires a considerably longer residence time for the formation of the active catalyst than does the utilization of the more easily converted cobalt soap and when it is desired to employ these insoluble forms of catalyst and use at the same time, liquid and gas through-put rates that are feasible with soluble cobalt soap in a continuous reaction, it has been found that a large proportion of the solid insoluble cobalt passes through the reaction zone without being converted at the reaction conditions, into cobalt carbonyl. This cobalt would have to be recovered, particularly in view of the present cobalt shortage, and represents a significant loss in reactor capacity as well as additional equipment necessary for the recovery of cobalt. It is therefore evident that it would be highly desirable to provide a proces for employing solid, readily available sources of cobalt such as cobalt oxide which would react to form cobalt carbonyl at rates equivalent to those of oil soluble cobalt compounds.

The following table, the result of extensive kinetic studies, illustrates the difference in reaction rates under similar reaction conditions, of various forms of cobalt. The rate constants $k$ and oleate comparison factors K, defined by the relationship $$K = \frac{(k) \text{ cobalt oleate}}{(k) \text{ catalyst}}$$

are summarized by the results below. The oleate comparison factor gives a direct measure of the activity of cobalt oleate with reference to the other forms of cobalt catalyst in question.

| Catalyst | Rate Constant (k) Min.⁻¹ (×10³) | Oleate Comparison Factor (K) |
|---|---|---|
| Cobalt Oleate | 85.6 | |
| Cobalt Oxide | 6.0 | 14.2 |
| Cobalt Metal | 2.9 | 29.5 |
| Cobalt Carbonate (ous) | 5.3 | 16.1 |
| Cobalt Oxalate (ous) | 4.9 | 17.5 |
| Cobalt Formate (basic) | 4.8 | 17.8 |

These data show that cobalt oleate gives about 14 times the reaction rate obtainable with cobalt oxide and about 30 times the rate characteristic of cobalt metal, the other insoluble salts having intermediate values, all far poorer than soluble cobalt oleate. Thus it can readily be seen that insoluble forms of cobalt are much poorer than soluble forms from the standpoint of reaction velocity in the oxo process.

It has further been found, that in the aldehyde synthesis reaction, in a continuous operation, the effect of time of contact of the reagents, i. e. catalyst, olefin, and synthesis gas, is extremely pronounced, and linear gas velocities critically influence the catalyst efficiency. This is illustrated by the following examples:

| Example | 1 | 2 | 3 |
|---|---|---|---|
| Reactor Dimensions | 1″ x 5′ | 1″ x 5′ | 19″ x 26′ |
| Feed (olefin) | | C₇ Polymer | |
| Feed Rate, V./V./Hr.¹ | 0.6 | 1.2 | 0.8 |
| Excess Synthesis gas, cu. ft./B | 6,000 | 6,000 | 6,000 |
| Pressure | 2,800–3,000 p. s. i. g. | | |
| Catalyst | Co oxide 0.3% Co on olefin | | |
| Avg. Temp., °F | 350 | 350 | 340–350 |
| Approximate linear velocity (Liquid and gas), ft./sec. | 0.004 | 0.008 | 0.05 |
| Conversion of olefin, percent | 79–83 | 70–72 | ² 40 |

¹ Based on superficial volume of reactor.
² Conversion dropped from 78% with cobalt oleate to 40% in three hours when catalyst was changed to oxide.

These data show that while satisfactory utilization can be achieved in small apparatus the higher linear velocities necessary in large scale equipment result in greatly decreased conversion. Under the conditions of Example 3 most of the cobalt was recovered as unchanged cobalt oxide, that is, there was little or no conversion to cobalt carbonyl or hydrocarbonyl. Under the conditions of tests 1 and 2 there was no insoluble cobalt in the reaction product.

It has also now been found that the conversion of solid forms of cobalt such as cobalt oxide, into cobalt carbonyl proceeds at a considerably higher rate when, in the presence of an $H_2$ and CO comprising gas, the temperature is maintained at about 150 to 250° F. at pressures of 2500–3500 p. s. i. g. than when the temperature is maintained at aldehyde synthesis reaction temperatures, that is, at 300–375° F. Under the carbonyl forming conditions, however, relatively little olefin conversion is obtained; also higher conversion than about 25% must be avoided, for the highly exothermic aldehyde synthesis reaction makes difficult the concentration of large amounts of the active catalyst species. When appreciable aldehyde conversion occurs, the temperature is of necessity in the region above that favoring rapid formation of carbonyl from cobalt oxide.

It is, therefore, an object of the present invention to provide an improved process for maintaining high concentrations of cobalt carbonyl in an aldehyde synthesis reaction zone when cheap solid oil-insoluble forms of cobalt are employed as source of cobalt carbonyl.

It is also an object of the present invention to maintain high olefin conversions employing solid forms of cobalt, at gas and olefin throughput rates normally associated with the more expensive oil-soluble forms of cobalt, employing commercially feasible equipment, in a continuous operation.

Other and further objects and advantages of the invention will in part be obvious and will in part appear hereinafter.

These objects and advantages may, in brief, be achieved by employing a two-stage rather than a single stage olefin conversion system, wherein, in the first stage, reaction conditions are maintained to maximize conversion of cobalt oxide to cobalt carbonyl and minimize conversion of olefin (in order to maintain low temperatures), while in the second stage, reaction conditions are maintained to maximize olefin conversions. It has of course, in the past been recognized that solid forms of cobalt may be converted into cobalt carbonyl, and that cobalt carbonyl, or hydrocarbonyl, is the active catalyst, but the vital and critical role that temperature plays in the conversion of solid cobalt to cobalt carbonyl has not been appreciated nor understood.

In the first stage of the present invention a linear velocity of about 0.004–0.008 ft./second is maintained in conjunction with the low temperature levels referred to above. In the second stage, a considerably higher linear velocity in the range of 0.05–0.1 ft./second is employed, at a temperature of 350° F., to take advantage of the high olefin conversion rates obtained at that temperature. Therefore, both the gas and the olefin streams are split, about 10–50% of the olefin feed being introduced into the first zone, and synthesis gas being admitted in proportions to give the critical linear velocities above.

In accordance with the present invention, therefore, a slurry or paste of insoluble catalytic material and a portion of fresh or partially converted feed is passed to the first stage of reactor. A synthesis gas mixture comprising $H_2$ and CO in a ratio of about 1 to 1 is passed into the first stage reactor, and maintained at pressures about 2500 to 3500 p. s. i. g. The temperature level maintained therein is about 150–250° F., preferably 175–225° F. The total effluent from the first stage is then passed to a second stage wherein the temperature is raised to 300–375° F. and wherein conversion is completed. The total throughput of the gas and liquid is adjusted to give the desired conversion level, generally in the range of 70–80 mol percent.

The present invention will best be understood from the more detailed description presented hereinafter, wherein reference will be made to the accompanying drawings which are schematic illustrations of systems suitable for carrying out preferred embodiments of the invention.

Referring now to Figure I, which is a two-vessel aldehyde synthesis reactor, an olefinic hydrocarbon having one less carbon atom than the number of carbon atoms in the desired resulting oxygenated compound is fed through feed line 6 to the bottom portion of first stage reactor 4. Simultaneously there is introduced through line 6 and preheater 8, a slurry, suspension, or paste comprising a solid olefin-insoluble form of cobalt, such as cobalt oxide, carbonate, basic formate, metal, or other readily available forms of this metal suspended or dispersed in the olefin. When a paste is employed, such may be prepared by mixing finely-divided powder with about 50% by weight of petrolatum; pump erosion and solids settling are thereby minimized. The amount of catalyst added is about 0.1–0.5% by weight of the total olefin to be converted to aldehyde and alcohol product. Inasmuch as it is preferable to split the olefin feed stream between the first and second primary reaction stages, and since all the catalyst is added in the first stage reactor 4, it is evident that the proportion of cobalt to olefin is greater than these figures. Thus, in general, 10–50% of the total olefin to be converted is passed into reactor 4.

Within reactor 4, a pressure of $H_2$ and CO of about 2500–3500 p. s. i. g. is maintained, and a temperature level of 150–250° F., preferably 175–225° F. Significantly higher temperatures must be avoided in this stage, due to marked decrease in conversion level of cobalt oxide to cobalt carbonyl. Reaction conditions, feed rates, contact time all are carefully adjusted within reactor 4 to avoid temperatures either higher or lower than the range above, for lower temperatures prevent formation of the carbonyl at appreciable rates. Thus liquid feed rates of 0.1 to 0.5 v./v./hr. and gas rates of 500 to 3000 cu. ft./bbl. of olefin may be employed. It is desirable to take a limited conversion of olefin product in this stage to provide the temperature level designated above.

After sufficient residence time for substantially all of the added solid cobalt to be converted into cobalt carbonyl, which under the reaction conditions is very rapid, the total effluent is withdrawn overhead through line 10. The effluent comprises olefin, aldehyde product, cobalt carbonyl, and is substantially free of suspended or dispersed cobalt solids. This material may advantageously, though not necessarily, be passed through high pressure separator 12, and the liquid withdrawn through line 14 is passed to the bottom portion of second stage primary reactor 16.

Reactor 16 is preferably operated at pressures of about 2000 to 3500 p. s. i. g. but the temperature level is substantially higher, between about 300–375° F. Additional synthesis gas may be added to this stage through line 20, and the balance of the olefin is added through lines 22 and 20. The total gas and liquid throughput is adjusted to give the desired conversion level, generally in the range of 70–80% (mol). The higher temperature level in 16 is controlled by the more complete conversion level of the olefin feed, and by recycle of cooled reactor product as shown below. Because all of the catalyst in reactor 16 is already in the form of the active cobalt carbonyl, there is no time lag in this reactor necessitated by conversion of other forms of cobalt into the active catalyst species, and so conversion of olefin to aldehydes is extremely rapid, and so a shorter residence time than in conventional processes may be used.

Liquid oxygenated reaction products comprising aldehydes and dissolved cobalt are withdrawn from the upper portion of reactor 16. This material which is at a pressure of about 3000 p. s. i. g. and at 300–375° F. is passed via line 24 to cooler 26 wherein the total effluent is cooled to about 60–120° F., and is then passed to high pressure separator 28, wherein unreacted gases are separated from liquids. The unreacted gases are withdrawn through line 30 and in part recycled.

A stream of liquid aldehyde product containing dissolved cobalt is withdrawn through line 32 and a portion is pumped via line 34 back to reactor 16 to maintain adequate cooling in that zone, and may be injected into 16 at various levels or zones to maintain temperature uniformity. Liquid aldehyde product not recycled may be withdrawn through line 36 and after pressure release and further degassing, is passed to decobalting zone 38 wherein, at pressure of about atmospheric to 500 p. s. i. g., the aldehyde product is heated to about 200–400° F. in the presence of an inert gas, such as hydrogen, or with steam, to decompose the cobalt carbonyl and other soluble forms of cobalt, into oil-insoluble material, including cobalt metal, oxides, carbonates, basic carbonates, and formates. The gas aids in stripping and purging evolved CO from the system through line 42.

Liquid aldehyde reaction products now substantially free of dissolved carbonylation catalyst are withdrawn from catalyst removal zone 38 through line 44, and passed to solids recovery zone 46, wherein solid cobalt material formed as a result of thermal or other treatments in vessel 38 is recovered either by settling, filtration, or other conventional means.

The metal-free liquid product is then withdrawn through line 48 for further processing, preferably to produce alcohols by hydrogenation. Recovered metal and solid cobalt compounds insoluble in olefins and aldehydes may be withdrawn from solids recovery system 46 through line 50, and may be reused in the process by suspending them in the olefin feed passed to first stage reactor 4.

Instead of the two-vessel aldehyde synthesis reaction operation described heretofore, a single reaction oven may be advantageously employed, suitably baffled and staged. Figure II shows such an aldehyde synthesis oven. Reactor 60 is preferably divided into two zones, a lower zone 64 and an upper zone 66 suitably packed for intimate contacting, and separated by baffles 62. A minor proportion of the olefin feed wherein is suspended, dispersed, or entrained all the catalyst for the operation is admitted through line 70 and flows upwardly. Catalyst may be cobalt oxide, carbonate, basic formate, decobalter solids, and the like, previously enumerated and discussed. About 10–50% of the total olefin feed to the system is passed through line 70.

A minor portion of the total synthesis gas feed is passed through line 68 into zone 64. It is essential that the linear gas velocity through zone 64 be no greater than 0.01 feet/second, preferably about 0.004 feet/second, and even less. Under these conditions, pressures of about 2500 to 3500 p. s. i. g. and temperatures of 175–250° F. preferably about 225° F. obtain in zone 64. About 10 to 25% of the total gas supplied oven 60 is admitted through lower zone 64.

As a result of the low temperature level and linear gas velocity, substantially all of the cobalt solids are converted into oil-soluble material, without converting too high a proportion of the olefin to aldehyde, which must be avoided so that temperatures may be kept low. The partially converted olefin, dissolved cobalt, and unreacted gases pass upwardly through baffles 62 into the upper reaction zone 66. The balance of the olefin feed, preheated to about 325° F., in order to provide a temperature of about 350° F. in zone 66, is admitted through line 72. This feed corresponds to about 50–90% of the total olefin passed to the aldehyde reactor 60. Concomitantly, $H_2$ and CO are admitted through line 74 in about equal proportions. In this zone the inlet velocity is at least 10 times greater than in lower zone 64, and is about 0.05–0.1 ft./sec. This is made possible because the solid form of cobalt has been converted into oil-soluble material in the lower zone. About 75 to 90% of the total gas to the system is passed through line 74 into reactor 60. The bulk of the olefin conversion takes place in zone 66, and after suitable residence time to obtain the desired conversion level, product is withdrawn overhead through line 76 and processed as described in connection with Figure I. Cooling is also advantageously provided by recycling a portion of the aldehyde product.

Under certain circumstances it may be desirable, instead of employing solid forms of cobalt, to employ water-soluble forms of readily available cobalt compounds, such as cobalt acetate. The solutions also may advantageously be injected into the primary low temperature reaction stage; at the higher temperatures of 300–375° F., conducive to aldehyde reaction, the conversion of water soluble salts to cobalt carbonyl is also slower than at the lower temperatures of 175–225° F. When steam or hot water or dilute aqueous acids are employed to decompose cobalt in the decobalter, the recovered water layer containing cobalt salts may thus be employed. Also, as a medium for the passage of cobalt solids to the first stage, there may be employed in addition, aldehyde product, or partially converted olefin product.

The process of the present invention may be further illustrated by the following examples.

EXAMPLE I

To show the incompleteness of conversion of solid forms of cobalt when employed under reaction conditions which would result in substantially complete conversion of an oil-soluble cobalt compound into cobalt carbonyl, the following data are relevant. Run "A" is representative of the reaction conditions and results obtained commercially wherein a heptene fraction is converted into octyl aldehyde and alcohol employing cobalt oleate as a catalyst. In Run "B" cobalt oleate was replaced by an equivalent amount of oil-insoluble cobalt oxide. The runs were carried out at about 3000 p. s. i. g. total pressure.

|  | A | B |
|---|---|---|
| Feed Rate, V./V./Hr. | 0.80 | 0.80 |
| Conversion, Percent | 78 | 40 |
| Synthesis Gas Rate, C. F./B | 6,500 | 6,400 |
| H₂ to CO Ratio | 1.2 | 1.3 |
| Oven Temperature, °F | 348 | 343 |
| Catalyst, Wt. Percent Co on Feed | 0.28 | 0.3 |
| Decobalting | Excellent | Poor |
| Solid Cobalt Compounds in Reactor Effluent | Absent | Present |

The above data clearly show that with the employment of solid cobalt oxide as catalyst under conditions wherein the cobalt oleate catalyst was substantially completely converted to cobalt carbonyl and an olefin conversion of 78% was obtained, the equivalent amount of cobalt as cobalt oxide gave only a 40% conversion. Furthermore, it was found that cobalt oxide was washed through the reactor oven before it could be converted to the cobalt carbonyl form. This was evident from the presence of black particles of cobalt oxide. These black particles were found not only in the effluent from the aldehyde synthesis reactor but also, in the effluent from the decobalter. The decobalting, when cobalt oxide was employed as the catalyst under these conditions, was quite poor. These data point out clearly the fact that, in comparison with the use of oil-soluble cobalt compounds, the residence time of equivalent amounts of cobalt oxide and other solid forms of cobalt must be considerably larger in order for the equivalent amount of cobalt carbonyl and olefin conversion to be obtained, thus decreasing throughput rates.

EXAMPLE II

The first reaction stage of the present invention is operated at temperatures preferably between about 200° and 225° F. and substantially below the aldehyde synthesis reaction temperatures of 300° to 375° F. The criticality of this range is shown in the following experiments wherein solid cobalt material obtained from the decobalter from a large plant (250 barrel/day) was washed with naphtha, ground and screened through 35 mesh and pilled (3/16" pellets). The pills, which analyzed 37.3% by weight of cobalt, the remainder being iron, carbonaceous material and oxygen, etc., were charged to a reactor, and synthesis gas charged under conditions and with results shown in the following table.

| Period | Temp., °F. | Total Pressure | Olefin Conv., Percent | Wt. Percent Cobalt in Product |
|---|---|---|---|---|
| A | 300 | 2,975 | 84 | 0.29 |
| B | 276 | 3,000 | 78 | 0.81 |
| C | 225 | 2,970 | 68 | 3.00 |
| D | 200 | 3,000 | 34 | 2.12 |
| E | 179 | 3,000 | 9 | 0.95 |

These data show clearly that, in the range of between 200° and 300° F., particularly around 225° F., the cobalt carbonyl concentration goes through a maximum, although conversion of olefins to aldehydes in this temperature range is not favored.

EXAMPLE III

The conditions for maintaining high concentrations of cobalt carbonyl in the aldehyde synthesis reactor by conversion of solid cobalt entrained and dispersed therein, are shown by the following experiments. A slurry of cobalt oxide in aldehyde product was passed through a steam preheater to bring it to the various temperature levels as shown, and injected into a soaking vessel. Synthesis gas in the approximate ratio of 1:1 was injected and the vessel maintained at about 3000 p. s. i. g., with a linear gas velocity based on the exit gas, of 0.0004 feet per second.

| Average Temp., °F | 201 | 225 | 249 |
|---|---|---|---|
| Liquid, V./V./Hr | 0.25 | 0.25 | 0.24 |
| Cobalt, Wt. percent (oxide) | 2.74 | 2.71 | 2.82 |
| Cobalt in Liquid, Wt. Percent | 0.86 | 1.22 | 0.74 |
| Cobalt in Gas, Wt. Percent | 0.03 | 0.03 | 0.03 |

These results show that a relatively short contact time is sufficient to dissolve a high degree of cobalt in the form of cobalt carbonyl from the relatively coarse slow-reacting oxide. Colloidal particles are even more readily converted.

EXAMPLE IV

*First stage only*

| Run No. | A | B | C | D |
|---|---|---|---|---|
| Hours | 1-16 | 25-64 | 25-64 | 9-24 |
| Liquid Feed | Partially Converted Olefin | | | Fresh Olefin. |
| Catalyst | Cobalt Oxide | | Decobalter Solids.[1] | Cobalt Oxide. |
| Cobalt, Wt. Percent | 2.86 | 2.16 | 2.50 | 2.43. |
| Avg. Temperature, °F | 225 | 227 | 225 | 229. |
| Pressure, p. s. i. g | 3,000 | 2,750 | 2,750 | 2,780. |
| Cobalt (Soluble) in Liquid Product, Wt. Percent. | 1.96 | 1.76 | 1.40 | 0.99. |
| Cobalt Balance, Wt. Percent | | 96 | 63 | 55. |
| Olefin Conversion, Mol Percent. | | | | 66. |

[1] Mixture of cobalt metal and basic formate from plant decobalting system.

These data indicate that at a temperature of 225–230° F. cobalt oxide is almost completely converted to soluble forms of cobalt at a synthesis gas pressure of 2750–3000 p. s. i. g. in the presence of a partially converted feed. In the presence of fresh olefin feed (which is converted to the extent of 66% on passing through the first stage) recovery of soluble cobalt is somewhat low as a result of solubility limitations.

EXAMPLE V

*Integrated operations—First and second stages*

| Run No. | E | F | G | H | I |
|---|---|---|---|---|---|
| Hours | 33-80 | 49-72 | 13-66 | 25-80 | 1-16 |
| First Stage: | | | | | |
| Liquid Feed | Fresh Olefin. | Partially Converted Olefin | | | |
| Catalyst | Cobalt Oxide | | | Decobalter Solids. | Cobalt Oleate. |
| Cobalt, Wt. Percent [1] | 0.28 | 0.31 | 0.30 | 0.36 | 0.29. |
| Avg. Temperature, °F | 224 | 226 | 226 | 226 | |
| Pressure, p. s. i. g | 2,700 | 2,730 | 2,740 | 2,750 | |
| Second Stage: | | | | | |
| Liquid Feed | | C₇ Olefin | | | |
| Feed Rate, V./V./Hr.[2] | 1.1 | 1.1 | 1.6 | 1.1 | 1.0. |
| Avg. Temperature, °F | 350 | 350 | 348 | 348 | 350. |
| Pressure, p. s. i. g | 2,620 | 2,500 | 2,450 | 2,470 | 2,890. |
| Olefin Conversion, Mol Percent | 77 | 78 | 69 | 68 | 77. |
| Selectivity, Mol Percent | | 78-80 | 78-81 | 79 | 75. |
| Cobalt Balance, Wt. Percent | 75 | 94 | 98 | 55 | 68. |

[1] Based on total olefin.
[2] Based on total liquid.

These data illustrate the following:

(1) Integrated operations with cobalt oxide give conversions equivalent to those obtained with cobalt oleate under more severe conditions (77–78% conversion at 1.1 v./v./hr. and 2500–2600 p. s. i. g. compared to 77% conversion at 1.0 v./v./hr. and 2900 p. s. i. g. with cobalt oleate).

(2) Cobalt recovery is much more complete with the integrated cobalt oxide operation than with a single stage synthesis with cobalt oleate.

Numerous modifications apparent to those skilled in the art are within the scope of the invention.

What is claimed is:

1. In the process for the production of aldehydes from olefins wherein olefinic compounds are contacted with $H_2$, CO and a cobalt catalyst at elevated temperatures and pressures, the improvement which comprises passing to an initial reaction zone 10 to 50% of the total fresh olefin feed, $H_2$, CO and a finely divided olefin-insoluble cobalt material said cobalt material representing the total amount of catalyst required in the subsequent reaction zone, maintaining a pressure of about 2000–3500 p. s. i. g. and a temperature of about 150–250° F. in said zone, maintaining a linear gas velocity through said zone of 0.004 to 0.01 feet/second, maintaining a sufficient residence time of said components within said zone to convert substantially all of said cobalt to cobalt carbonyls but converting not more than a minor proportion of said olefin to aldehyde product, passing liquid effluent free from solids from said zone to a second reaction zone, passing to said zone the balance of the fresh olefin feed, passing $H_2$ and CO to said zone, maintaining a temperature of about 300–375° F. and a pressure of about 2000–3500 p. s. i. g. in said zone, maintaining a linear gas velocity through said zone of about 0.05 to 0.1 feet per second, maintaining an olefin conversion level of about 70–80 mol % in said zone, and withdrawing a product rich in aldehydes from said second reaction zone.

2. The process of claim 1 wherein the linear gas velocity through said first zone is about 0.004–0.008 feet/second.

3. The process of claim 1 wherein said cobalt material is cobalt oxide.

4. The process of claim 1 wherein said cobalt material is a salt.

References Cited in the file of this patent

UNITED STATES PATENTS

| | | |
|---|---|---|
| 2,464,916 | Adams et al. | Mar. 22, 1949 |
| 2,477,553 | McKeever | July 26, 1949 |
| 2,587,858 | Keulemans | Mar. 4, 1952 |

FOREIGN PATENTS

| | | |
|---|---|---|
| 625,909 | Great Britain | Aug. 14, 1946 |
| 644,665 | Great Britain | Oct. 18, 1950 |
| 646,744 | Great Britain | Nov. 29, 1950 |

OTHER REFERENCES

Adkins et al.: J. Amer. Chem. Soc., vol. 70, pp. 383–386, January 1948.